US009764790B2

(12) United States Patent
Granell Peniche et al.

(10) Patent No.: US 9,764,790 B2
(45) Date of Patent: Sep. 19, 2017

(54) TRANSPORTATION DEVICE FOLDABLE BETWEEN PERSONAL TRANSPORTER AND BICYCLE CONFIGURATIONS

(71) Applicant: Ford Global Technologies, LLC, Dearborn, MI (US)

(72) Inventors: Enrique Granell Peniche, Naucalpan de Juarez/DF (MX); Luis Soni Gutierrez, Coyoacan/DF (MX); Francisco Ronquillo, Puebla (MX); David Castro Duran, Estado de Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/807,699

(22) Filed: Jul. 23, 2015

(65) Prior Publication Data

US 2017/0021893 A1    Jan. 26, 2017

(51) Int. Cl.
*B62K 17/00*    (2006.01)
*B62K 15/00*    (2006.01)

(52) U.S. Cl.
CPC ............ *B62K 17/00* (2013.01); *B62K 15/008* (2013.01); *B62K 2207/00* (2013.01)

(58) Field of Classification Search
CPC ... B62K 17/00; B62K 15/008; B62K 2207/00
See application file for complete search history.

(56) References Cited

U.S. PATENT DOCUMENTS

| 4,229,018 A  * | 10/1980 | Chika ..................... B62K 27/02 280/203 |
| 6,796,396 B2 | 9/2004 | Kamen et al. |
| 8,528,928 B1 * | 9/2013 | Kim ..................... B62K 15/006 280/287 |
| 9,205,889 B2 * | 12/2015 | Paick ....................... B62M 6/60 |

FOREIGN PATENT DOCUMENTS

| CN | 2247628 U | 2/1997 |
| CN | 1740041 A | 3/2006 |
| CN | 203681783 U | 7/2014 |
| CN | 103991499 A | 8/2014 |
| DE | 10045396 | 7/2003 |
| JP | 2005119349 | 5/2005 |
| WO | WO 2014080166 | 5/2014 |

* cited by examiner

*Primary Examiner* — Richard Camby
(74) *Attorney, Agent, or Firm* — Frank MacKenzie; Bejin Bieneman PLC

(57) ABSTRACT

A transportation device includes a frame foldable between a bicycle configuration and a personal transporter configuration. A sensor configured to sense when the frame is in at least one of the bicycle configuration and the personal transporter configuration. A first wheel and a second wheel are each rotatably coupled to the frame. A first motor is coupled to the first wheel and a second motor is coupled to the second wheel. A controller is programmed to instruct the first motor to rotate in a first direction in response to a signal from the sensor that the frame is in the bicycle configuration, and to instruct the first motor to rotate in a second direction opposite the first direction in response to a signal from the sensor that the frame is in the personal transporter configuration.

16 Claims, 5 Drawing Sheets

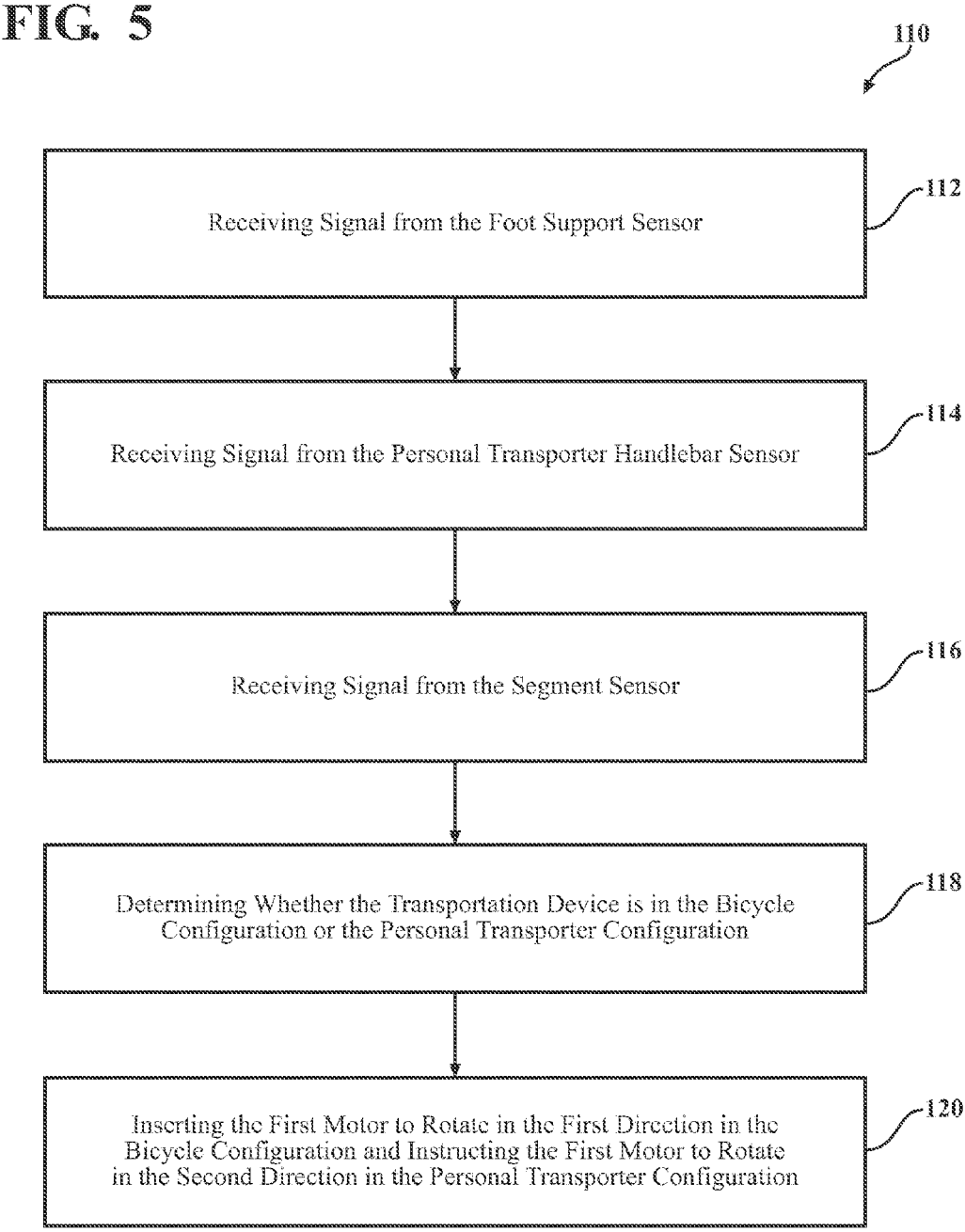

ID-CORRECTED

TRANSPORTATION DEVICE FOLDABLE BETWEEN PERSONAL TRANSPORTER AND BICYCLE CONFIGURATIONS

BACKGROUND

Electric bicycles may be used as a primary source and/or secondary source of transportation. For example, as a primary source of transportation, a user may travel on the electric bicycle from a starting point to a final destination. The starting point may be, for example, a residence of the driver, and the final destination may be, for example, a place of employment. The electric bicycle may be more compact than other modes of transportation and, as such, may be more easily maneuvered in congested areas such as dense commercial areas that attract high traffic during business hours. As a secondary source of transportation, the electric bicycle may be transported in a vehicle, e.g., an automobile, train, etc., from the starting point to another location, such as a parking spot. The remainder of the trip may be completed by driving the bicycle from that intermediate location to the final destination. For example, the parking spot may be a commuter parking lot located on outskirts of a congested commercial area.

However, some disadvantages of electric bicycles may make it difficult to operate the electric bicycle in specific areas, thus forcing the driver of the electric bicycle to dismount the electric bicycle and walk the electric bicycle through those areas. For example, some areas forbid operation of any type of bicycle and limit travel to walking and handicapped equivalents. Congested enclosed areas, for example, train stations, may forbid the operation of bicycles. In addition, the size and shape of bicycles may make transport of bicycles difficult on public transportation, e.g., trains, subways, etc.

As such, there remains an opportunity to design a transportation device that includes the function of a bicycle but is also conveniently and easily operated in areas where operation of bicycles is forbidden.

BRIEF DESCRIPTION OF THE DRAWINGS

FIG. 5 is a flow chart of a method of operating the transportation device.

DETAILED DESCRIPTION

Figure 1:
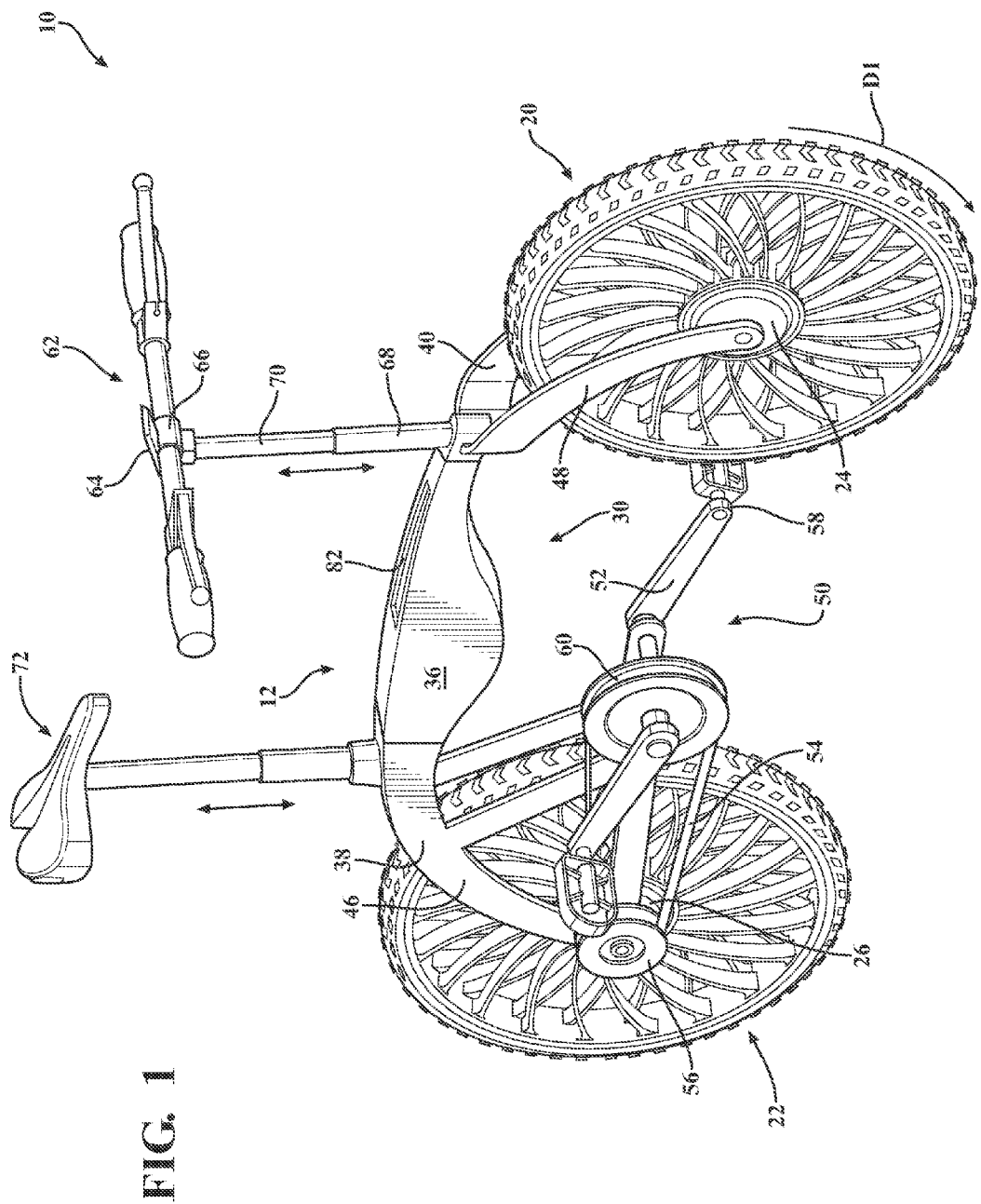
FIG. 1 a perspective view of a transportation device in a bicycle configuration.
Figure 2:
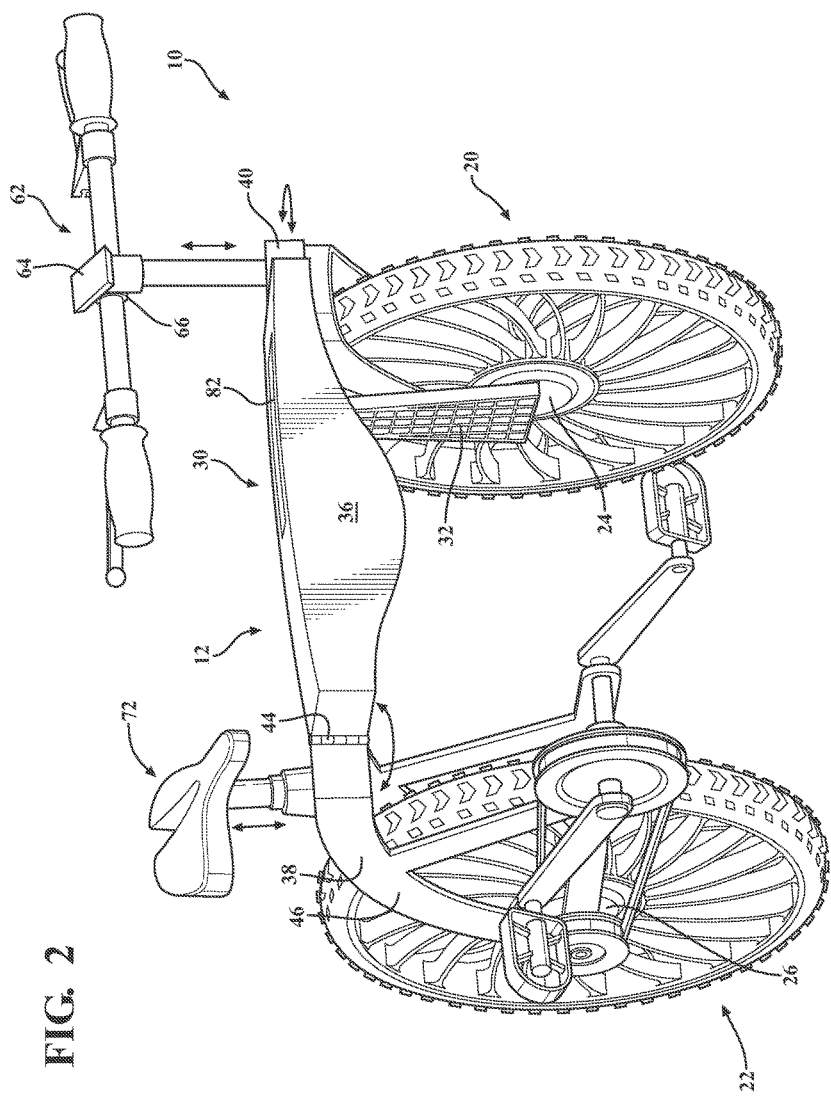
FIG. 2 is a perspective view of the transportation device being transformed from a bicycle configuration to a personal transporter configuration.
Figure 3:
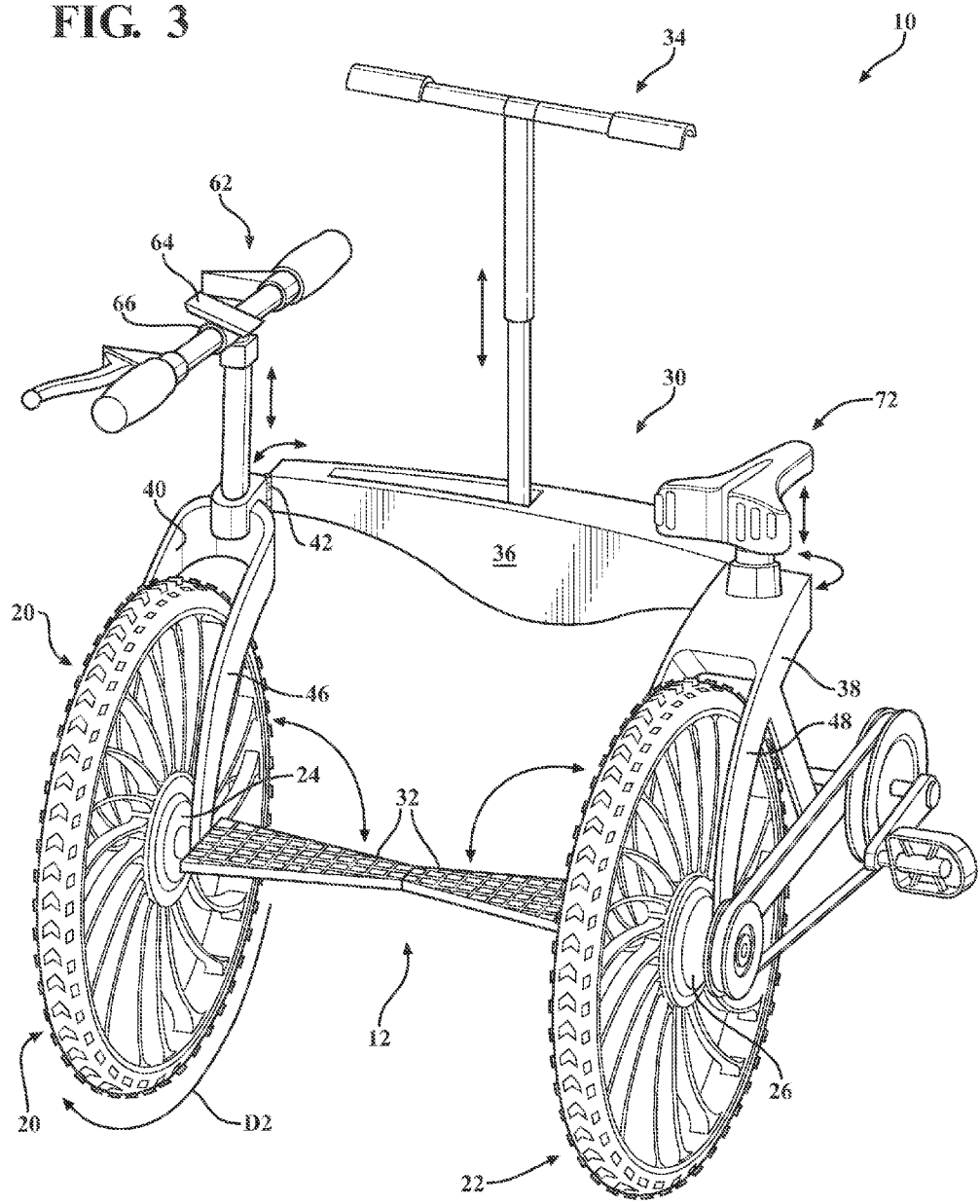
FIG. 3 is a perspective view of the transportation device in the personal transporter configuration.
Figure 4:
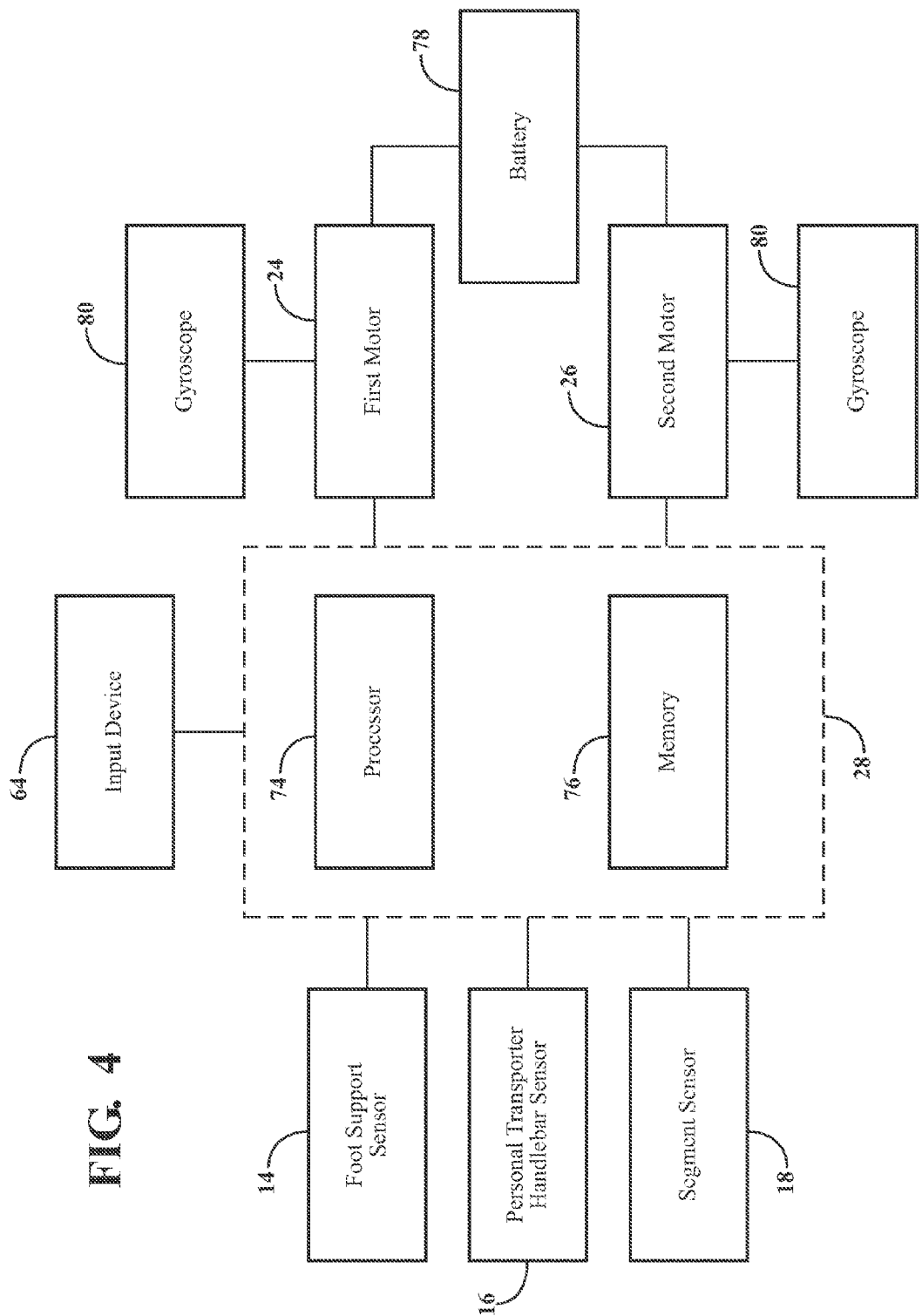
FIG. 4 is a schematic view of a control system of the transportation device.

With reference to the Figures, wherein like numerals indicate like parts throughout the several views, a transportation device 10 includes a frame 12 foldable between a bicycle configuration, as shown in FIG. 1, and a personal transporter configuration, as shown in FIG. 3. A sensor 14, 16, 18, as shown in FIG. 4, is configured to sense when the frame 12 is in at least one of the bicycle configuration and the personal transporter configuration. As shown in FIGS. 1-3, the transportation device 10 includes a first wheel 20 and a second wheel 22 each rotatably coupled to the frame 12. A first motor 24 is coupled to the first wheel 20 and a second motor 26 coupled to the second wheel 22. A controller 28, as shown in FIG. 4, is programmed to instruct the first motor 24 to rotate in a first direction D1 in response to a signal from the sensor 14, 16, 18 that the frame 12 is in the bicycle configuration, and to instruct the first motor 24 to rotate in a second direction D2 opposite the first direction D1 in response to a signal from the sensor 14, 16, 18 that the frame 12 is in the personal transporter configuration.

When the frame 12 is in the bicycle configuration, as shown in FIG. 1, the first motor 24 and the second motor 26 may rotate the first wheel 20 and the second wheel 22, respectively, in a common direction to propel the transportation device 10 forward. In this bicycle configuration, the controller 28 is programmed to instruct the first motor 24 to rotate in the first direction D1, e.g., clock-wise in FIG. 1. However, when the frame 12 is moved from the bicycle configuration to the personal transporter configuration, as shown in FIG. 3, the first motor 24 and wheel may be rotated approximately 180 degrees. In this personal transporter configuration, the controller 28 is programmed to instruct the first motor 24 to rotate in the second direction D2, opposite the first direction D1, e.g. clock-wise in FIG. 3.

With reference to FIGS. 1-3, the frame 12 includes a main segment 30, at least one foot support 32, and a personal transporter handlebar 34. The main segment 30 may include a middle segment 36, a rear segment 38 hinged to the middle segment 36, and a front segment 40 hinged to the middle segment 36 spaced from the rear segment 38. Each of the middle segment 36, the rear segment 38, and the front segment 40 may be formed of any suitable material, e.g., metal such as steel, aluminum, etc., composite such as carbon fiber, etc.

The front segment 40 and the rear segment 38 are moveable relative to the middle segment 36 between the bicycle configuration and the personal transporter configuration. For example, as best shown in FIG. 2, a hinge 42 may connect the rear segment 38 and the middle segment 36. As best shown in FIG. 3, a hinge 44 may connect the front segment 40 to the middle segment 36. The hinges 42, 44 may be of any suitable type. The hinges 42, 44 may releasably lock the front segment 40 and the rear segment 38 relative to the middle segment 36 in the bicycle configuration and/or in the personal transporter configuration. Alternatively, in addition, the front segment 40, the rear segment 38, and/or the middle segment 36 may include another lock (not shown) that releasably locks the rear segment 38 relative to the middle segment 36 in the bicycle configuration and/or in the personal transporter configuration.

The front segment 40 may support the first wheel 20. For example, the front segment 40 may include a fork 46 that engages the first wheel 20. Similarly, the rear segment 38 may support the second wheel 22. For example, the rear segment 38 may include a fork 48 that engages the second wheel 22.

The rear segment 38 may support a manual drive train 50. For example, the manual drive train 50 may include a crank 52, a belt 54, and a gear 56 on the second wheel 22. Specifically, the crank 52 may include two pedals 58 and a gear 60 that engages the belt 54. The belt 54 extends between the gear 60 on the crank 52 and the gear 56 on the second wheel 22 to transmit rotation from the crank 52 to the second wheel 22 when a driver of the transportation device 10 manually pedals the crank 52 when the transportation device 10 is in the bicycle configuration, as shown in FIG. 1. The belt 54 may be formed of an elastomeric or fabric. In the alternative to the belt 54, the manual drive train 50 may include a chain formed, for example, of metal, plastic, etc.

The frame 12 may include a bicycle handlebar 62. The bicycle handlebar 62 may be supported on the front segment 40 of the frame 12. The bicycle handlebar 62 may be connected to the fork 46 of the front segment 40 and may transmit rotation to the fork 46, i.e., when the driver steers the transportation device 10 when in the bicycle configuration.

The bicycle handlebar 62 may include controls for the transportation device 10 to control the transportation device 10 when in the bicycle configuration. For example, the bicycle handlebar 62 may include brake levers (not numbered), an input device 64, etc. The input device 64 may be a mobile device that may be removeably docked to the bicycle handlebar 62. The input device 64 may be, for example, a mobile phone, tablet, etc. The bicycle handlebar 62 may include a dock 66 in communication with the controller 28 to communicate signals between the input device 64 and the controller 28, e.g., to control one or more operations of the transportation device 10 and/or to display information from the transportation device 10 on the input device 64.

The bicycle handlebar 62 may be extendable relative to the main segment 30 to the bicycle configuration, as shown in FIG. 1, and retractable relative to the main segment 30 to the personal transporter configuration, as shown in FIG. 2. For example, the bicycle handlebar 62 may include a base post 68 fixed to the fork 46 of the front segment 40 of the frame 12, and a moveable post 70 that is retractable into and extendable from the base post 68. The moveable post 70/and or the base post 68 may include a lock (not shown) for locking the moveable post 70 in the retracted position and/or the extended position.

The frame 12 includes at least one foot support 32, e.g., two foot supports 32 as shown in the Figures. The foot supports 32 may each be independently extendable relative to the main segment 30 to the personal transporter configuration, as shown in FIG. 3, and retractable relative to the main segment 30 to the bicycle configuration, as shown in FIG. 1.

As best shown in FIG. 3, for example, the frame 12 may include one foot support 32 supported on the front segment 40, e.g., the fork 46, and one foot support 32 supported on the rear segment 38, e.g., the fork 48. The foot supports 32 are configured to support a driver the transportation device 10 when in the personal transporter configuration, i.e., are sized, shaped, and formed of a suitable material to support the weight of the driver as the driver stands on the foot supports 32. The foot supports 32 may be formed of any suitable material, e.g., metal, composite, plastic, etc. The foot supports 32 may engage each other, i.e., interlock, as best shown in FIG. 3, when the foot supports 32 are extended relative to the main segment 30.

The personal transporter handlebar 34 is extendable relative to the main segment 30 to the personal transporter configuration, as shown in FIG. 3, and retractable relative to the main segment 30 to the bicycle configuration, as shown in FIG. 1. For example, the personal transporter handlebar 34 may be extendable from and retractable into the middle portion of the frame 12. The middle portion, for example, may define a cavity 82 for receiving the personal transporter handlebar 34 in a retracted position. The personal transporter handlebar 34 may include hinged segments and telescoping components to fit in the cavity 82 in the retracted position, i.e., in the bicycle configuration.

The transportation device 10 may include a seat 72 that is extendable from and retractable to one of main segment 30 of the frame 12. For example, the seat 72 may be extendable from the rear segment 38 in the bicycle configuration, as shown in FIG. 1, and may be retractable from the rear segment 38 in the personal transporter configuration.

The transportation device 10 may include one or more sensors 14, 16, 18 for sensing when components of the transportation device 10 are in the bicycle configuration, as shown in FIG. 1, and/or the personal transporter configuration, as shown in FIG. 3. For example, as shown in FIG. 4, the transportation device 10 may include a sensor, i.e., a foot support sensor 14, configured to sense a position of the foot support 32 relative to the main segment 30, a sensor, i.e., a personal transporter handlebar sensor 16, configured to sense a position of the personal transporter handlebar 34 relative to the main segment 30, and/or a sensor, i.e., a segment sensor 18, configured to sense a position of at least one of the front segment 40 and the rear segment 38 relative to the middle segment 36. The transportation device 10 may also include other sensors for sensing when other components of the transportation device 10 are in the bicycle configuration and/or the personal transporter configuration. For example, the transportation device 10 may include a seat sensor (not shown) configured to sense when the seat 72 is extended from and/or retracted to the main segment 30 of the frame 12.

The foot support sensor 14, the personal transporter handlebar sensor 16, and the segment sensor 18 may be of any suitable type and may be of the same type or different types than each other. As one example, the foot support sensor 14, the personal transporter handlebar sensor 16, and/or the segment sensor 18 may be proximity sensors, e.g., capacitive, Hall effect, optical, etc. As another example, foot support sensor 14, the personal transporter handlebar sensor 16, and/or the segment sensor 18 may be mechanical switches.

The foot support sensor 14, the personal transporter handlebar sensor 16, and the segment sensor 18 may be in communication with the controller 28 in any suitable fashion. For example, the foot support sensor 14, the personal transporter handlebar sensor 16, and/or the segment sensor 18 may be wired directly or indirectly to the controller 28. As another example, the foot support sensor 14, the personal transporter handlebar sensor 16, and/or the segment sensor 18 may be communicate with the controller 28 wirelessly.

The transportation device 10 includes means for rotating the first wheel 20 in a first direction D1 when the frame 12 is in the bicycle configuration and rotating the first wheel 20 in a second direction D2 opposite the first direction D1 when the frame 12 is in the personal transporter configuration. Specifically, as set forth above, the means may be the controller 28, as set forth above, and structural equivalents thereof.

The controller 28 may, for example, be a computing device programmed to provide an instruction to the first wheel 20 to rotate in the first direction D1 in response to a signal from the foot support sensor 14, the personal transporter handlebar sensor 16, and/or the segment sensor 18 that the frame 12 is in the bicycle configuration and to provide an instruction to the first wheel 20 to rotate in the second direction D2 in response to a signal from the foot support sensor 14, the personal transporter handlebar sensor 16, and/or the segment sensor 18 that the frame 12 is in the personal transporter configuration. The computing device may include any suitable components. For example, the computing device may include a processor 74, memory 76, etc. The memory 76 may store instructions comprising programming to provide an instruction to the first wheel 20 to rotate in the first direction D1 in response to a signal from the foot support sensor 14, the personal transporter handlebar sensor 16, and/or the segment sensor 18 that the frame 12 is in the bicycle configuration and to provide an instruction to the first wheel 20 to rotate in the second direction D2 in response to a signal from the foot support sensor 14, the personal transporter handlebar sensor 16, and/or the segment sensor 18 that the frame 12 is in the personal transporter configuration.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor 74 (e.g., a microprocessor) receives instructions, e.g., from a memory 76, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The first motor 24 and the second motor 26 may be of any suitable type and may be of the same type of different type than each other. As one example, the first motor 24 and the second motor 26 may be electric motors. In such a configuration, as shown in FIG. 4, the transportation device 10 may include a battery 78 in communication with the first motor 24 and the second motor 26.

The second motor 26 rotates in a common direction in both the bicycle configuration and the personal transporter configuration. In other words, unlike the first motor 24, the frame 12 does not rotate the first motor 24 between the bicycle configuration and the personal transporter configuration.

The transportation device 10 may include at least one gyroscope 80 in communication with both the first motor 24 and the second motor 26. For example, as shown in FIG. 4, the transportation device 10 may include one gyroscope 80 in communication with the first motor 24 and one gyroscope 80 in communication with the second motor 26.

The controller 28 may also control the operation of the first motor 24 and the second motor 26. For example, when the transportation device 10 is in the bicycle configuration, the controller 28 may be programmed to provide instructions to the first motor 24 and/or the second motor 26 to control the rotational speed of the first motor 24 and/or the second motor 26. For example, the transportation device 10 in the bicycle configuration may be operated in a powered mode, e.g., fully powered PEDELEC, etc., where the first motor 24 and/or the second motor 26 propel the transportation device 10. The driver may control the speed of the first motor 24 and/or the second motor 26 through the input device 64, controls on the bicycle handlebar 62, etc.

As another example, when the transportation device 10 is in the personal transporter configuration, the controller 28 may be programmed to provide instructions to the first motor 24 and/or the second motor 26 to control the rotational speed of the first motor 24 and/or the second motor 26 to control the rotational speed of the first motor 24 and/or the second motor 26 in response to signals from the gyroscopes 80. The controller 28 may, for example, provide instructions to the first motor 24 and/or the second motor 26 based on the signals from the gyroscopes 80 to balance the transportation device 10. In other words, the transportation device 10 in the personal transporter configuration may be self-balancing.

In use, the transportation device 10 may be moved to the bicycle mode, as shown in FIG. 1, by unfolding the front segment 40 and the rear segment 38 of the frame 12 from the middle segment 36 of the frame 12, retracting the foot supports 32, retracting the personal transporter handlebar 34 into the cavity 82, and extending the bicycle handlebar 62. In this configuration, at least one of the foot support sensor 14, personal transporter handlebar sensor 16, and segment sensors 18 provides a signal to the controller 28 that the transportation device 10 is the in the bicycle configuration. When the controller 28 receives signals that the transportation device 10 is in the bicycle configuration, the controller 28 operates in a bicycle mode. For example, in the bicycle mode, the controller 28 provides an instruction to the first motor 24 to rotate in the first direction D1.

The transportation device 10 may be moved to the personal transporter configuration, as shown in FIG. 1, by folding the front segment 40 and the rear segment 38 relative to the middle segment 36, extending the foot supports 32, extending the personal transporter handlebar 34 from the cavity 82, and retracting the bicycle handlebar 62. In this configuration, at least one of the foot support sensor 14, personal transporter handlebar sensor 16, and segment sensors 18 provides a signal to the controller 28 that the transportation device 10 is the in the personal transporter configuration. When the controller 28 receives signals that the transportation device 10 is in the personal transporter configuration, the controller 28 operates in a personal transporter mode. For example, in the personal transporter mode, the controller 28 provides an instruction to the first motor 24 to rotate in the second direction D2.

A method of controlling the transportation device 10 is shown in FIG. 5. As shown in blocks 112-116, the method includes receiving a signal from a sensor indicating that the frame 12 is in one of the bicycle configuration and the personal transporter configuration. Specifically, as shown in block 112, the method includes receiving a signal from the foot support sensor 14 indicating that the foot support 32 is one of extended relative to the frame 12 and retracted relative to the frame 12, i.e., indicating that the foot support 32 is either extended or retracted relative to the frame 12. Specifically, the controller 28 receives the signal from the foot support sensor 14, as set forth above.

As shown in block 114 of FIG. 5, the method includes receiving a signal from the personal transporter handlebar sensor 16 indicating that the personal transporter handlebar 34 is in one of extended from the cavity 82 in the middle segment 36 of the frame 12 or retracted into the cavity 82 in the middle segment 36 of the frame 12, i.e., indicating that the personal transporter handlebar 34 is extended or retracted. Specifically, the controller 28 receives the signal from the personal transporter handlebar sensor 16.

As shown in block 116 of FIG. 5, the method includes receiving a signal from the segment sensor 18 indicating that the front segment 40 and/or the rear segment 38 is one of folded and unfolded relative to the middle segment 36, i.e., indicating that the front segment 40 and/or the rear segment 38 is folded or unfolded. Specifically, the controller 28 receives the signal from the segment sensor 18.

As shown in block 118 of FIG. 5, based on the signal from the foot support sensor 14, the personal transporter handle sensor, and/or the segment sensor 18, the method includes determining whether the transportation device 10 is in the bicycle configuration or in the personal transporter configuration. Specifically, the controller 28 determines whether the transportation device 10 is in the bicycle configuration or in the personal transporter configuration.

As shown in block 120 of FIG. 5, based on the signal from the foot support sensor 14, the personal transporter handle sensor, and/or the segment sensor 18, the method includes instructing the first motor 24 to rotate in a first direction D1 when the frame 12 is in the bicycle configuration and instructing the first motor 24 to rotate in a second direction D2 opposite the first direction D1 when the frame 12 is in the personal transporter configuration, as set forth above. Specifically, the controller 28 instructs the first motor 24. The controller 28 may repeatedly receive signals from the foot support sensor 14, the personal transporter handle sensor, and/or the segment sensor 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A transportation device comprising:
   a frame foldable between a bicycle configuration and a personal transporter configuration;
   a sensor configured to sense when the frame is in at least one of the bicycle configuration and the personal transporter configuration;
   a first wheel and a second wheel each rotatably coupled to the frame;
   a first motor coupled to the first wheel and a second motor coupled to the second wheel; and
   a controller programmed to instruct the first motor to rotate in a first direction in response to a signal from the sensor that the frame is in the bicycle configuration, and to instruct the first motor to rotate in a second direction opposite the first direction in response to a signal from the sensor that the frame is in the personal transporter configuration.

2. The transportation device as set forth in claim 1 wherein the frame includes a main segment and at least one foot support extendable relative to the main segment to the personal transporter configuration and retractable relative to the main segment to the bicycle configuration.

3. The transportation device as set forth in claim 2 wherein the sensor is configured to sense a position of the foot support relative to the main segment.

4. The transportation device as set forth in claim 2 wherein the main segment includes a middle segment, a rear segment hinged to the middle segment, and a front segment hinged to the middle segment spaced from the rear segment, the front segment and the rear segment being moveable relative to the middle segment between the bicycle configuration and the personal transporter configuration.

5. The transportation device as set forth in claim 4 wherein the sensor is configured to sense a position of the foot support relative to the main segment, and further comprising a second sensor configured to sense a position of at least one of the front segment and the rear segment relative to the middle segment.

6. The transportation device as set forth in claim 1 wherein the frame includes a main segment and a personal transporter handlebar extendable relative to the main segment to the personal transporter configuration and retractable relative to the main segment to the bicycle configuration.

7. The transportation device as set forth in claim 6 wherein the sensor is configured to sense a position of the personal transporter handlebar relative to the main segment.

8. The transportation device as set forth in claim 6 wherein the main segment includes a middle segment, a rear segment hinged to the middle segment, and a front segment hinged to the middle segment spaced from the rear segment, the front segment and the rear segment being moveable relative to the middle segment between the bicycle configuration and the personal transporter configuration.

9. The transportation device as set forth in claim 8 wherein the sensor is configured to sense a position of the personal transporter handlebar relative to the main segment, and further comprising a second sensor configured to sense a position of at least one of the front segment and the rear segment relative to the middle segment.

10. The transportation device as set forth in claim 9 wherein the frame includes a foot support extendable relative to the main segment to the personal transporter configuration and retractable relative to the main segment to the bicycle configuration, and further comprising a third sensor configured to sense a position of the foot support relative to the main segment.

11. The transportation device as set forth in claim 6 wherein the frame includes a bicycle handlebar extendable relative to the main segment to the bicycle configuration and retractable relative to the main segment to the personal transporter configuration.

12. The transportation device as set forth in claim 1 wherein the first motor and the second motor are electric motors, and further comprising a battery in communication with the first motor and the second motor.

13. The transportation device as set forth in claim 12 further comprising a gyroscope in communication with both the first motor and the second motor.

14. The transportation device as set forth in claim 1 wherein the second motor rotates in a common direction in both the bicycle configuration and the personal transporter configuration.

15. A method of controlling a transportation device including a frame foldable between a bicycle configuration and a personal transporter configuration, a first and second wheel each rotatably coupled to the frame, a first motor coupled to the first wheel, and a second motor coupled to the second wheel, the method comprising:
   receiving a signal from a sensor indicating that the frame is in one of the bicycle configuration and the personal transporter configuration;

based on the signal from the sensor, instructing the first motor to rotate in a first direction when the frame is in the bicycle configuration and instructing the first motor to rotate in a second direction opposite the first direction when the frame is in the personal transporter configuration.

16. A transportation device comprising:

a frame foldable between a bicycle configuration and a personal transporter configuration;

a sensor configured to sense when the frame is in at least one of the bicycle configuration and the personal transporter configuration;

a first wheel and a second wheel each rotatably coupled to the frame;

a first motor coupled to the first wheel and a second motor coupled to the second wheel; and means for rotating the first wheel in a first direction when the frame is in the bicycle configuration and rotating the first wheel in a second direction opposite the first direction when the frame is in the personal transporter configuration.

* * * * *